United States Patent Office 3,093,784
Patented June 11, 1963

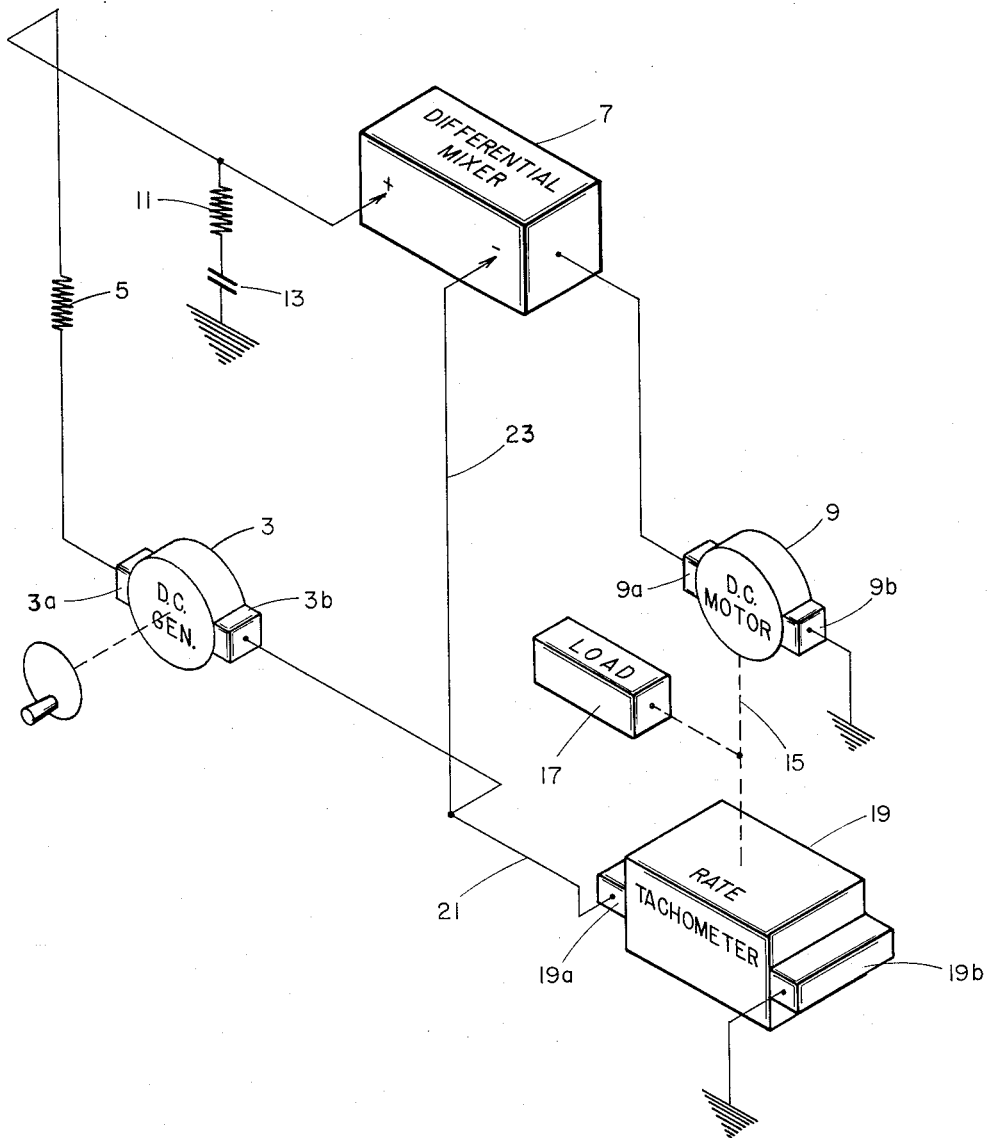

3,093,784
SIMPLIFIED AIDED TRACKING AND
COASTING SYSTEM
Alfred I. Mintzer, Riverton, N.J., assignor, by mesne assignments, to the United States of America as represented by the Secretary of the Navy
Filed Apr. 26, 1961, Ser. No. 105,828
2 Claims. (Cl. 318—327)

The present invention relates to a novel and improved aided tracking and coasting system and more particularly to a novel and improved aided tracking and coasting system wherein displacement and rate tracking are accomplished with unified control and yet without the use of costly integrators or additional rate servos.

Aided tracking is a combination of displacement and rate tracking. In pure displacement tracking the operator has a direct connection either mechanically or electrically with the controlled member. In tracking a target moving at constant rate, the operator must turn his handwheel at a constant rate. If he is lagging the target, he will turn faster until the error is corrected; if he is leading the target, he will turn more slowly. In pure rate tracking it is the speed of the output that is determined by the position of the operator's handwheel. In tracking a target moving at a constant rate the handwheel need not be turned after the proper adjustment has been made. When these two types of tracking are combined, aided tracking results. An error in rate and the resulting displacement error are corrected simultaneously. A change in the handwheel position changes the rate of motion of the output at the same time that the displacement error is corrected. Although various types of aided tracking systems have been suggested and used in the past, considerable difficulty has been experienced heretofore in providing such a system having unified control with capability of sustained accurate coast without the use of expensive and bulky integrators and/or additional rate servos.

It is therefore a principal object of the present invention to provide a novel and improved aided tracking system which provides unified control without the use of costly integrators and/or additional rate servos.

It is a further object of the present invention to provide a novel and improved aided tracking system which provides sustained coast capability without exponential or other substantial decay with time.

It is a further object of the present invention to provide a novel and improved aided tracking and coasting system wherein a controlled amount of rate voltage is bootstrapped back to a lag filter before application to the velocity point of a servo.

Other objects and many of the attendant advantages of this invention will be readily appreciated as the same becomes better understood by reference to the following detailed description when considered in connection with the accompanying drawing(s) wherein:

The single FIGURE is a diagrammatic view of a preferred embodiment of the present invention.

A preferred embodiment of the present invention is illustrated in FIGURE 1 of the drawing. As shown therein, terminal 3a of the handwheel controlled direct current generator 3 is connected to terminal 9a of the motor 9 through resistor 5 and the differential mixing circuit 7. Terminal 9b of the motor is grounded. The junction of resistor 5 and the differential mixing circuit 7 is connected to ground through resistor 11 and coasting condenser 13. Resistor 5 is chosen such that its resistance is many times greater than the resistance of resistor 11. The output shaft 15 of motor 9 is mechanically coupled to the load 17 and also to the input shaft of rate tachometer 19. Terminal 19a of rate tachometer 19 is connected to terminal 3b of the direct current generator 3 through conductor 21 and to the differential mixing circuit 7 through conductor 23. Terminal 19b of tachometer 19 is connected to ground.

In operation, the operator rotates the handwheel of the direct current generator 3 at an appropriate angular rate. The direct current voltage developed by the generator is applied through resistor 5 and the differential mixing circuit 7 to energize the motor 9. Rotation of the shaft 15 of motor 9 drives the load and also rotates the shaft and armature of the rate tachometer 19. Tachometer 19 produces a direct current voltage which is applied to the differential mixing circuit 7 through conductors 21 and 23. A signal proportional to the difference or error between the direct current output voltages of generator 3 and tachometer 19 is used to energize the motor 9 and control its speed. The velocity of output shaft of motor 9 rather than its ultimate position is therefore controlled by the voltage applied from generator 3 and motor 9 with rate tachometer 19 feeding negative direct current voltage back to the input circuit thereof through the differential mixer circuit 7 effectively provides a velocity servomechanism. The direct current voltage developed by rate tachometer 19 is also fed back to the generator 3 where it is mixed additively with the direct current voltage developed by generator 3. When the handwheel of generator 3 is operated, the developed direct current voltage is applied to condenser 13 through resistors 5 and 11 as well as the energizing windings of motor 9. Thus, when rotation ceases the motor continues to operate as condenser 11 provides the driving energy. Moreover, the positive feedback energy from tachometer 19 to the generator 3 substantially maintains the charge across condenser 13. In this way the mechanism will continue coast at the rate last developed by the generator. If the rate voltage is somewhat less than the voltage stored across condenser 13 the speed of motor 9 will gradually decay. If the rate voltage is somewhat greater than the voltage stored across condenser 13, the speed of motor 9 will gradually increase. The effective coast, however, can be maintained with reasonable accuracy over wide tolerance limits.

Although the above described system finds particular use in any type of radar tracking device it could also be used in other suitable automated operation or the like without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:
1. An aided tracking system comprising:
 (a) an electric motor;
 (b) a rate tachometer mechanically coupled to the output shaft of the motor;
 (c) a variable source of potential;
 (d) means for combining the output potential of the tachometer with the potential of the variable source;
 (e) means for integrating the combined potential of the tachometer and the variable source;
 (f) and means responsive to the difference between the integrated combined potential and output potential of the tachometer for energizing the motor.
2. An aided tracking system comprising:
 (a) a direct current motor;
 (b) a rate tachometer mechanically coupled to the output shaft of the motor;
 (c) a manually controlled direct current generator;

(d) means for combining the output potential of the tachometer with the output potential of the generator;

(e) an integration circuit coupled to the output of the combining means;

(f) and means responsive to the difference between the combined potential and the output potential of the tachometer for energizing the motor.

References Cited in the file of this patent

UNITED STATES PATENTS

| | | |
|---|---|---|
| 2,448,612 | McLaren | Sept. 7, 1948 |
| 2,471,422 | Frost | May 31, 1949 |
| 2,513,537 | Williams | July 4, 1950 |
| 2,777,103 | Reed | Jan. 8, 1957 |